(12) United States Patent
Fujii et al.

(10) Patent No.: US 9,387,874 B2
(45) Date of Patent: Jul. 12, 2016

(54) REAR WHEEL STEERING APPARATUS FOR VEHICLE

(71) Applicant: AISIN SEIKI KABUSHIKI KAISHA, Kariya-shi (JP)

(72) Inventors: Shimpei Fujii, Anjo (JP); Akiya Taneda, Anjo (JP); Shuuetsu Suzuki, Gamagori (JP); Teruhide Sato, Toyota (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/289,070

(22) Filed: May 28, 2014

(65) Prior Publication Data

US 2014/0353067 A1   Dec. 4, 2014

(30) Foreign Application Priority Data

May 29, 2013   (JP) ................................ 2013-112478
May 29, 2013   (JP) ................................ 2013-112482

(51) Int. Cl.
*B62D 5/04*   (2006.01)
*B60G 7/00*   (2006.01)
*B62D 7/15*   (2006.01)

(52) U.S. Cl.
CPC .............. *B62D 5/0406* (2013.01); *B60G 7/006* (2013.01); *B62D 7/1581* (2013.01); *B60G 2200/44* (2013.01); *B60G 2200/46* (2013.01); *B60G 2200/462* (2013.01); *B60G 2202/42* (2013.01); *B60G 2202/422* (2013.01); *B60G 2204/62* (2013.01)

(58) Field of Classification Search
CPC .................................................. B62D 5/0406
USPC ......................................................... 180/445
See application file for complete search history.

(56) References Cited

U.S. PATENT DOCUMENTS 4,987,788 A * 1/1991 Bausch ........................ 74/89.34
5,506,776 A   4/1996 Fushimi et al.
(Continued)

FOREIGN PATENT DOCUMENTS

EP   1970598 A1   9/2008
FR   2862937 A1   6/2005
JP   3028905 B2   4/2000
(Continued)

OTHER PUBLICATIONS

European Search Report issued on Oct. 6, 2014 by the European Patent Office, in corresponding European Patent Application No. 14170411.4. (6 pages).

*Primary Examiner* — Joseph Rocca
*Assistant Examiner* — Felicia L Brittman
(74) *Attorney, Agent, or Firm* — Buchanan Ingersoll & Rooney PC (57) ABSTRACT

A rear wheel steering apparatus for a vehicle includes a housing including a cylinder portion and a connection cover, an electric motor housed in the housing, a speed reduction mechanism housed in the housing, a linear motion mechanism including a nut member and a rod for converting a rotation of the nut member to a linear motion of the rod, the cylinder portion including a stopper portion provided at an inner surface of thereof between the electric motor and the speed reduction mechanism, a cylindrical holding member holding the speed reduction mechanism in the cylinder portion, and a bearing supporting the nut member for allowing the nut member to rotate relative to the cylindrical holding member. The bearing and the cylindrical holding member are sandwiched between the stopper portion and the connection cover and the cylindrical holding member is retained so as not to rotate relative to the cylinder portion.

4 Claims, 6 Drawing Sheets

(56) References Cited

U.S. PATENT DOCUMENTS

| | | | |
|---|---|---|---|
| 5,595,089 A | 1/1997 | Watanabe et al. | |
| 8,607,920 B2 * | 12/2013 | Jungbecker et al. | 180/445 |
| 2002/0195294 A1 * | 12/2002 | Taneda et al. | 180/445 |
| 2008/0223160 A1 | 9/2008 | Yamaguchi | |
| 2009/0255349 A1 * | 10/2009 | Segawa | 73/862.325 |

FOREIGN PATENT DOCUMENTS

| | | |
|---|---|---|
| JP | 3068779 B2 | 7/2000 |
| JP | 3206783 B2 | 9/2001 |
| JP | 2012-511465 A | 5/2012 |
| JP | 5098242 B2 | 12/2012 |
| WO | WO 2010/066732 A1 | 6/2010 |

* cited by examiner

REAR WHEEL STEERING APPARATUS FOR VEHICLE

CROSS REFERENCE TO RELATED APPLICATIONS

This application is based on and claims priority under 35 U.S.C. §119 to Japanese Patent Application 2013-112478, filed on May 29, 2013 and Japanese Patent Application 2013-112482, filed on May 29, 2013, the entire content of which are incorporated herein by reference.

TECHNICAL FIELD

This disclosure generally relates to a rear wheel steering apparatus for a vehicle.

BACKGROUND DISCUSSION

Various known rear steering apparatuses each serving as a part of a four-wheel steering system of a vehicle are disclosed. For example, JP5098242B (i.e., hereinafter referred to as Patent reference 1) discloses a basic structure that includes a rod connected to rear wheels of a vehicle, a housing supporting the rod and fixed to a chassis of the vehicle, and a motor housed in the housing and actuating the rod for steering the rear wheels. There are various types of suspension mechanisms for supporting rear wheels of a vehicle and thus types of the rear wheel steering apparatus mounted to the suspension mechanism are varied. For example, JP2012-511465A (i.e., hereinafter referred to as Patent reference 2) discloses an apparatus that includes a blocking device for selectively transmitting a drive force from an electric motor to a push rod and the blocking device is supported by a module housing together with the electric motor and a transmission that is for converting a rotation of the electric motor to a translation of the push rod.

According to the known rear steering apparatuses disclosed in Patent reference 1 and Patent reference 2, it is difficult to downsize and to reduce the weight of the apparatus because the housing requires high intensity in order to absorb an axial force of the rod caused by a reaction force of tires and disturbances. Particularly, according to the construction of Patent reference 2, because the electric motor, the transmission, and the blocking device are supported by the module housing, the housing requires high intensity. Thus, it is difficult to downsize the apparatus.

A need thus exists for a rear steering apparatus for a vehicle which is not susceptible to the drawback mentioned above.

SUMMARY

In light of the foregoing, the disclosure provides a rear wheel steering apparatus for a vehicle, which includes a housing configured to be connected to a suspension mechanism supporting vehicle rear wheels via a first connection member and a second connection member, the housing including a cylinder portion and a connection cover, an electric motor housed in the housing, a speed reduction mechanism housed in the housing and reducing speed of an output of the electric motor, a linear motion mechanism including a nut member rotatably connected to the speed reduction mechanism, the linear motion mechanism including a rod threadingly engaged with the nut member and connected to the second connection member, the linear motion mechanism converting a rotation of the nut member to a linear motion of the rod, the cylinder portion housing the electric motor and the speed reduction mechanism which are arranged in series, the cylinder portion including a stopper portion provided at an inner surface of the cylinder portion between the electric motor and the speed reduction mechanism, the connection cover including the first connection member and closing an opening of the cylinder portion provided closer to the speed reduction mechanism, a cylindrical holding member holding the speed reduction mechanism in the cylinder portion, and a bearing supporting the nut member for allowing the nut member to rotate relative to the cylindrical holding member. The bearing and the cylindrical holding member are sandwiched between the stopper portion of the cylinder portion and the connection cover and the cylindrical holding member is retained so as not to rotate relative to the cylinder portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
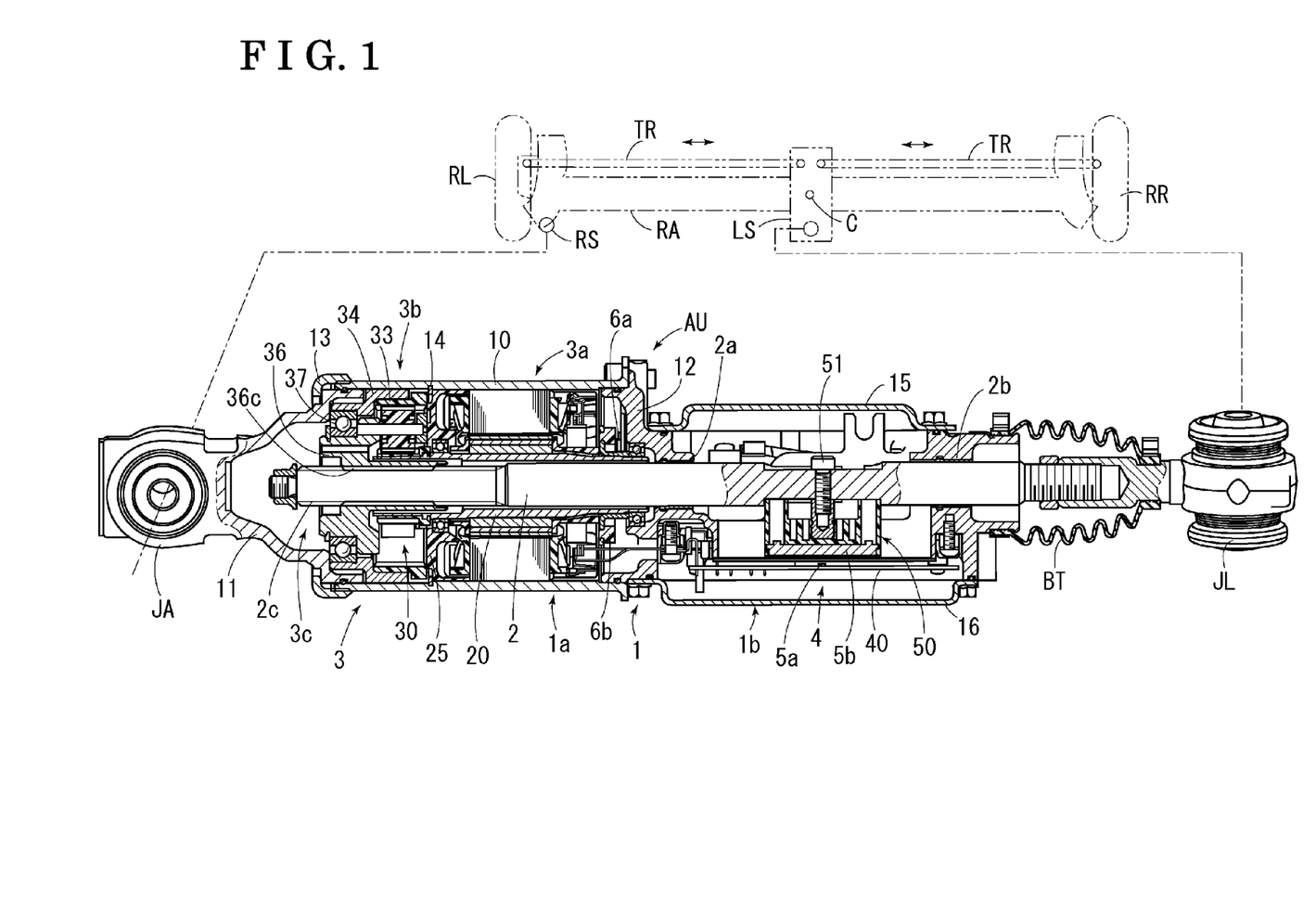
FIG. 1 is a lateral cross-sectional view illustrating an overall construction of a rear wheel steering apparatus according to an embodiment disclosed here.

One embodiment will be explained with reference to illustrations of drawing figures as follows. A rear wheel steering apparatus of the embodiment serves as a portion of a four-wheel steering system (4WS). The construction of a front wheel steering apparatus is the same to known constructions, thus the construction of the front wheel steering apparatus will not be explained. There are various suspension mechanisms for supporting vehicle rear wheels. According to the embodiment, as illustrated in FIG. 1, a suspension mechanism is structured as indicated with two-dotted chain line, where an actuator unit AU constructing a rear wheel steering apparatus of the embodiment is provided between a support portion RS and a link LS. The support portion RS supports a rear axle RA that supports vehicle rear wheels RL, RR. The link LS is rotationally supported by the rear axle RA and rotates about a center C. According to the suspension mechanism of the embodiment, a relative position between the support portion RS and the link LS is changed by the actuation of the actuator unit AU so that a distance between the support portion RS and the link LS is expanded and contracted, and thus the rear wheels RL, RR are steered via tie rods TR, TR, respectively in response to the rotation of the link LS.

The actuator unit AU is supported by a housing 1 in a manner that a rod 2 is axially movable (linear motion), an end of the actuator unit AU is connected to the link LS via a ball joint JL (serving as a second connection member), and the housing 1 is connected to the support portion RS via a ball joint JA (serving as a first connection member). Upon the actuation of the rod 2 by an actuator 3, the relative position between the support portion RS of the rear axle RA and the link LS is changed so that the distance between the support portion RS and the link LS is expanded and contracted. More particularly, an electric motor 3a constructing the actuator 3 is controlled by a controller 4, and a rotational output of the electric motor 3a is converted into the linear motion of the rod 2 via a linear motion mechanism 3c after the speed of the rotational output of the electric motor 3a is reduced by a speed reduction mechanism 3b. According to the embodiment, a brushless motor is applied as the electric motor 3a.

According to the embodiment, the housing 1 includes a first housing 1a that accommodates components (e.g., the electric motor 3a) of the actuator 3 and a second housing 1b that accommodates components (e.g., electronic circuit board 40) of the controller 4. A connection cover 11 is joined to a cylinder portion 10 that structures the first housing 1a. A casing 12 that structures the second housing 1b and includes opening portions in an axial direction and in an upward-downward direction is joined to the cylinder portion 10. Cover members 15, 16 are joined to the casing 12 at opening portions that open in the upward-downward direction, respectively. The housing 1 of the embodiment is made of metal. The connection cover 11 and the casing 12 are made of aluminum. The cylinder portion 10 and the cover members 15, 16 are made of iron.

Figure 2:
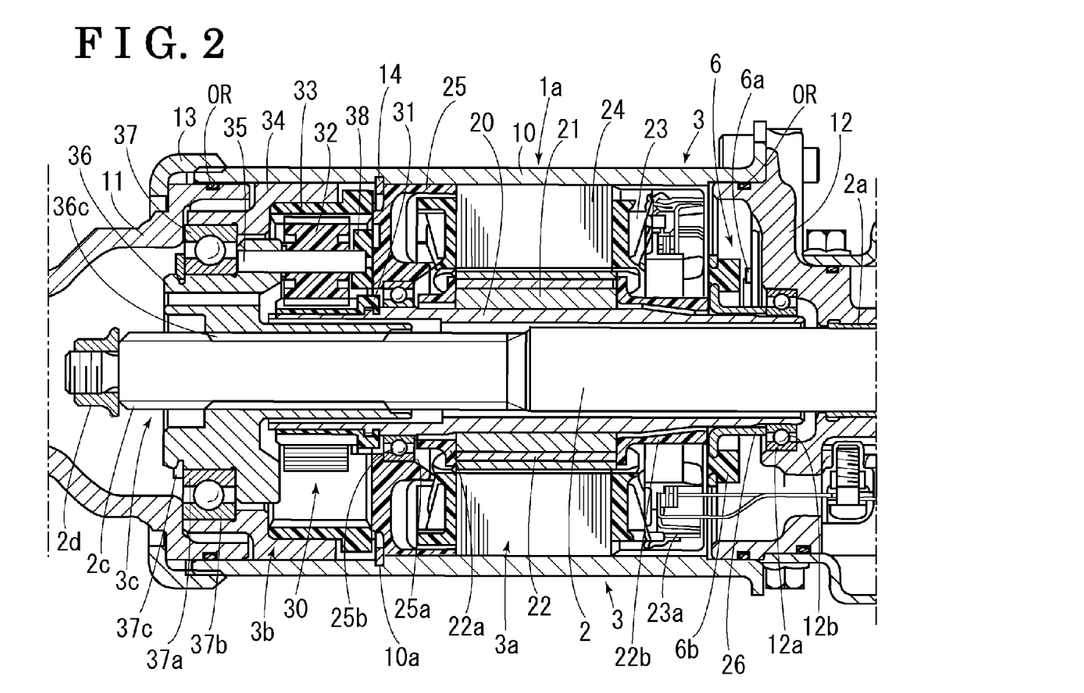
FIG. 2 is an enlarged lateral cross-sectional view showing an actuator unit of the rear wheel steering apparatus according to the embodiment disclosed here.

As illustrated in FIG. 2, the actuator 3 is press-fitted into and fixed to the cylinder portion 10 in a state where coils 23 are wound at a stator 24. A hollow rotation shaft 20 serves as an output shaft of the electric motor 3a. The hollow rotation shaft 20 is rotatably supported at a bore portion 25a of an annular motor cover 25 that is positioned within the cylinder portion 10 and at an annular groove 12a formed on the casing 12 via bearings 25b, 12b, respectively. A core 21 that structures a rotor of the electric motor 3a is press fitted and fixed to an axial intermediate portion of the hollow rotation shaft 20. Permanent magnets 22 are positioned so as to be equally spaced in a circumferential direction of the core 21.

The rod 2 is coaxially positioned within the hollow rotation shaft 20. The rod 2 is supported to be axially movable relative to the housing 1 (linear motion) and not to be rotatable relative to the housing 1. Bushes 2a, 2b are provided between the rod 2 and a support portion of the casing 12 to reduce a slide resistance for providing a smooth axial motion of the rod 2. That is, because an expansion and contracting mechanism with a cantilever structure is provided according to the embodiment, function, or capacity as bearings for an axial motion mechanism for supporting double ends is not required for the bushes 2a, 2b.

The speed reduction mechanism 3b of the embodiment is structured with a planetary gear mechanism 30. The planetary gear mechanism 30 includes a sun gear 31 with an external gear, planetary gears 32 with external gears, and a ring gear 33 with an internal gear. The sun gear 31 is integrally connected to the hollow rotation shaft 20 and is rotatably supported together with the hollow rotation shaft 20. The ring gear 33 is fixed to a holder 34 serving as a cylindrical holding member. The planetary gear 32 is meshed with the sun gear 31 and the ring gear 33 to revolve about the sun gear 31. A nut member 36, which serves as a carrier rotatably supporting the planetary gear 32 via a pin 35, is rotatably supported at the holder 34 via a bearing 37. A ball bearing is applied as the bearing 37. An inner race 37a of the bearing 37 is fitted together with the nut member 36 and an outer race 37b of the bearing 37 is fitted together with the holder 34 so that the bearing 37 is retained at the nut member 36 by means of a C-shaped spacer 37c.

According to the embodiment, the holder 34 and the pin 35 are made of metal (e.g., iron). The sun gear 31, the planetary gear 32, and the ring gear 33 are made of synthetic resin. The sun gear 31 is integrally formed with the hollow rotation shaft 20 made of metal. The ring gear 33 is supported not to be rotatable relative to the holder 34. The holder 34 is supported so as not to be rotatable relative to the cylinder portion 10. More specifically, as illustrated in FIG. 2, a snap ring 14 is retained in an annular groove 10a formed on an inner surface of the cylinder portion 10. An annular lock nut 13 threadingly engages with a screw portion formed at an opening end of the speed reduction mechanism 3b (i.e., left-hand side in FIG. 2) of the cylinder portion 10 in a state where the outer race 37b of the bearing 37 and the holder 34 are sandwiched between an annular side surface of the snap ring 14 and an annular opening end surface of the connection cover 11. The cylinder portion 10 and the connection cover 11 are fastened, accordingly. The outer race 37b of the bearing 37 and the holder 34 are firmly supported between the snap ring 14 and the connection cover 11 by an axial pressure force generated in response to threading engagement of the lock nut 13 to the screw portion, and in consequence, the holder 34 is retained so as not to rotate relative to the cylinder portion 10. The snap ring 14 retained in the annular groove 10a serves as a stopper portion. Alternatively, instead of the annular groove 10a and the snap ring 14, an annular stepwise portion may be formed on an inner periphery surface of the cylinder portion 10. The annular stepwise portion may serve as the stopper portion.

The rod 2 and the nut member 36 are positioned so that a male screw portion 2c formed at an outer peripheral surface at an end portion of the rod 2 and a female screw portion 36c formed on an inner peripheral surface of the nut member 36 are threadingly engaged with each other. A trapezoidal screw formed on the outer peripheral surface at the end portion of the rod 2 over a predetermined axial length serves as the male screw portion 2c. The nut member 36 and the rod 2 structure the linear motion mechanism 3c. A nut 2d is threadingly engaged with an end of the male screw portion 2c to prevent the rod 2 from falling out, or disengaging. Because the rod 2 is supported in the above-explained manner, the load applied to the rod 2 in an axial direction is absorbed by the cylinder portion 10 and the connection cover 11 via the nut member 36, the bearing 37, the holder 34, and the snap ring 14.

Figure 3:
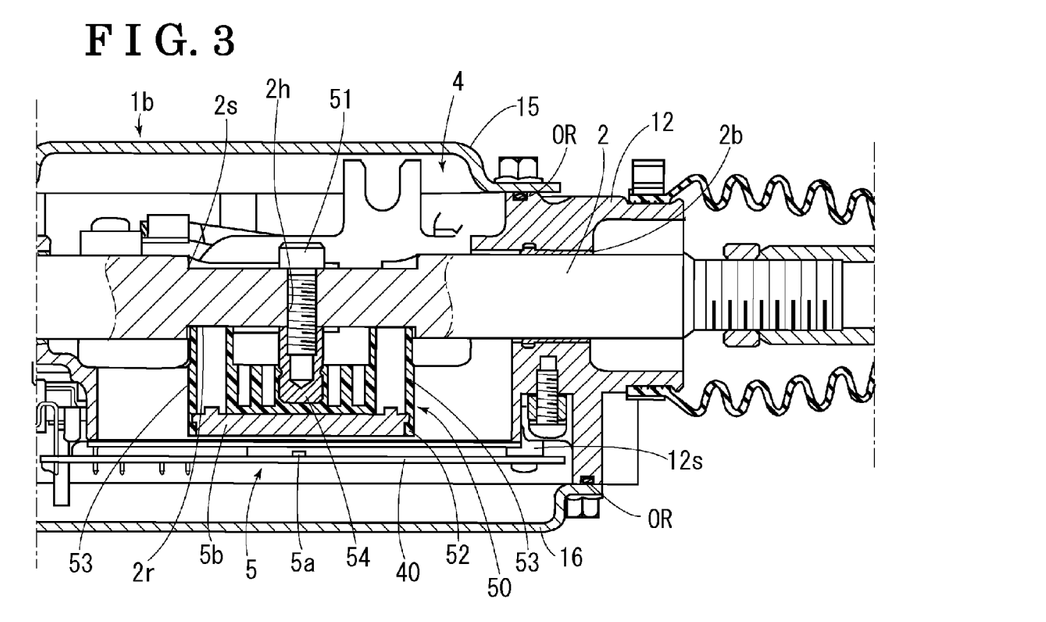
FIG. 3 is an enlarged lateral cross-sectional view showing a controller of the rear wheel steering apparatus according to the embodiment disclosed here.

On the other hand, as illustrated in FIG. 3, the electronic circuit board 40 structuring an electronic control unit and a magnetic block 50 structuring a displacement detection device 5 are housed within the second housing 1b. The displacement detection device 5 includes a displacement sensor 5a including a magnetic vector sensor, for example, and a permanent magnet 5b including a neodymium magnet, for example. The displacement sensor 5a is supported by the electronic circuit board 40. The permanent magnet 5b is retained within the magnetic block 50. The magnetic block 50 is configured to detect an axial displacement of the rod 2 when the rod 2 moves linearly (linear motion) and to block the rotation of the rod 2.

Figure 4:
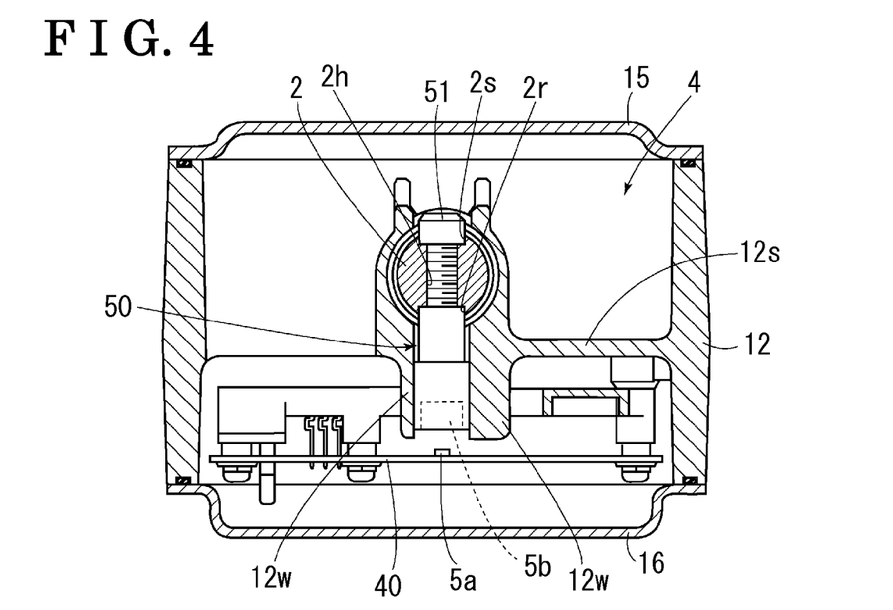
FIG. 4 is an enlarged longitudinal cross-sectional view showing the controller of the rear wheel steering apparatus according to the embodiment disclosed here.

As illustrated in FIGS. 3 and 4, first and second long grooves (substantially rectangular recessed portions) 2r, 2s that are elongated in an axial direction are formed at an outer periphery surface of the rod 2. The magnetic block 50 is positioned at the first long groove 2r and a bolt 51 is inserted via the second groove 2s to be fixed to the rod 2. The magnetic block 50 is made of synthetic resin. As illustrated in FIG. 3, the magnetic block 50 includes a retaining portion 52 that houses the permanent magnet 5b and a pair of leg portions 53, 53 extending from ends of the retaining portion 52, respectively. A nut 54 made of metal is formed by insert molding between the leg portions 53, 53. As illustrated in FIG. 4, a support portion 12s is formed inside the casing 12. A pair of wall portions 12w, 12w which are in parallel with an axis of the rod 2 is formed. The retaining portion 52 is assembled to be retained between the wall portions 12w, 12w and the bolt 51 is inserted into a through hole 2h of the rod 2 to be threadingly engaged with the nut 54. In consequence, the rod 2 is supported so as not to rotate relative to the wall portions 12w, 12w of the casing 12, that is, so as not to rotate relative to the housing 1 by means of the magnetic block 50.

According to the actuator 3 of the embodiment, upon the rotational actuation of the hollow rotation shaft 20 by the electric motor 3a, the speed of the rotational output is reduced by the speed reduction mechanism 3b of the planetary gear mechanism 30 to rotate the nut member 36 and thus the rotation of the nut member 36 is converted to the linear motion of the rod 2 by the linear motion mechanism 3c. Thus, as described above, the relative position between the support portion RS of the rear axle RA and the link LS is changed so that the distance between the support portion RS and the link LS is expanded and contracted, and thus a steering angle of the rear wheels is adjusted.

Figure 5:
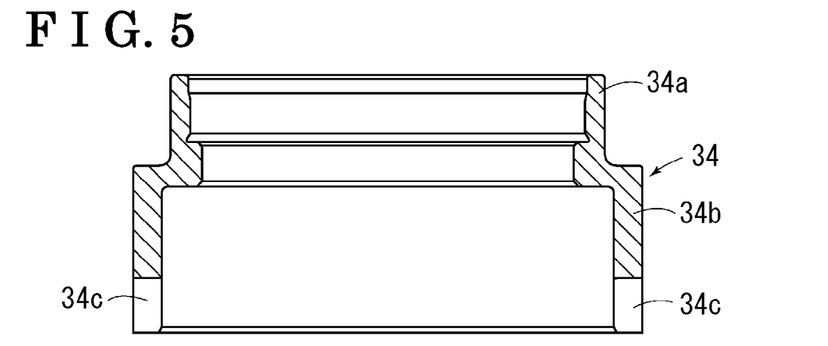
FIG. 5 is a lateral cross-sectional view illustrating a holder that structures a speed reduction mechanism according to the embodiment disclosed here.

A supporting structure of the ring gear 33 at the holder 34 will be explained as follows. As illustrated in FIG. 5, the holder 34 is formed in a cylindrical shape with a stepwise portion. Grooves 34c, 34c opening in an axial direction and opening through inner and outer peripheral surfaces of the holder 34 are formed on a peripheral wall of the holder 34. Alternatively, the grooves 34c, 34c may open to the inner peripheral surface of the holder 34 without opening to the outer peripheral surface.

Figure 6:
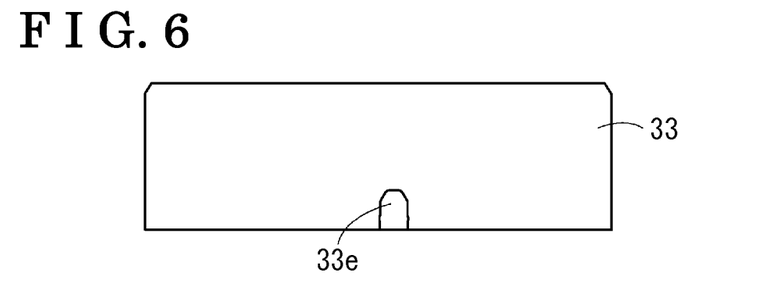
FIG. 6 shows an elevation of a ring gear that structures the speed reduction mechanism according to the embodiment disclosed here.
Figure 7:
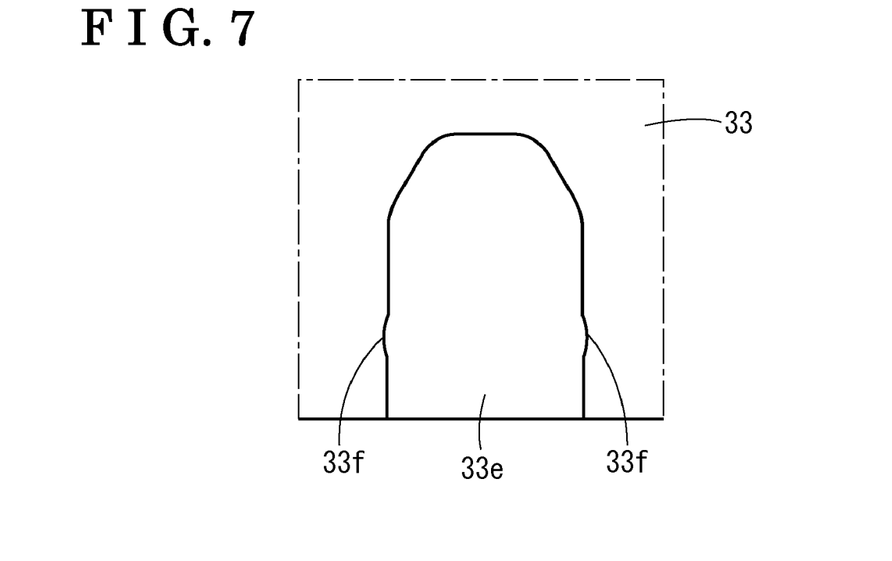
FIG. 7 shows an enlarged elevation of an engaging portion of the ring gear that structures the speed reduction mechanism according to the embodiment disclosed here.
Figure 8:
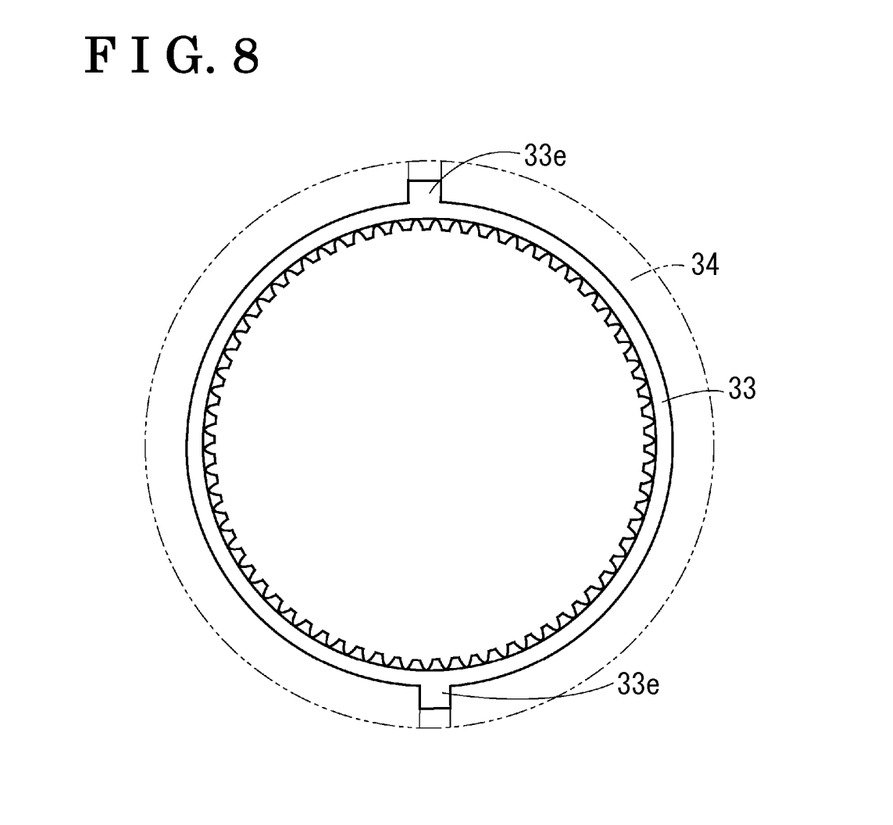
FIG. 8 shows a side elevation of the ring gear that structures the speed reduction mechanism according to the embodiment disclosed here.

On the other hand, the ring gear 33, as illustrated in FIGS. 6 to 8, is integrally fitted to the holder 34. As illustrated in FIG. 8, according to the embodiment, the ring gear 33 integrally includes a pair of engaging portions 33e, 33e that extend radially outward. The engaging portions 33e, 33e are positioned to oppose to each other in the radial direction. A radial length (height) and an axial length of the engaging portions 33e, 33e are defined to be shorter than a radial length (height) and an axial length of the grooves 34c, 34c of the holder 34, respectively.

Figure 9:
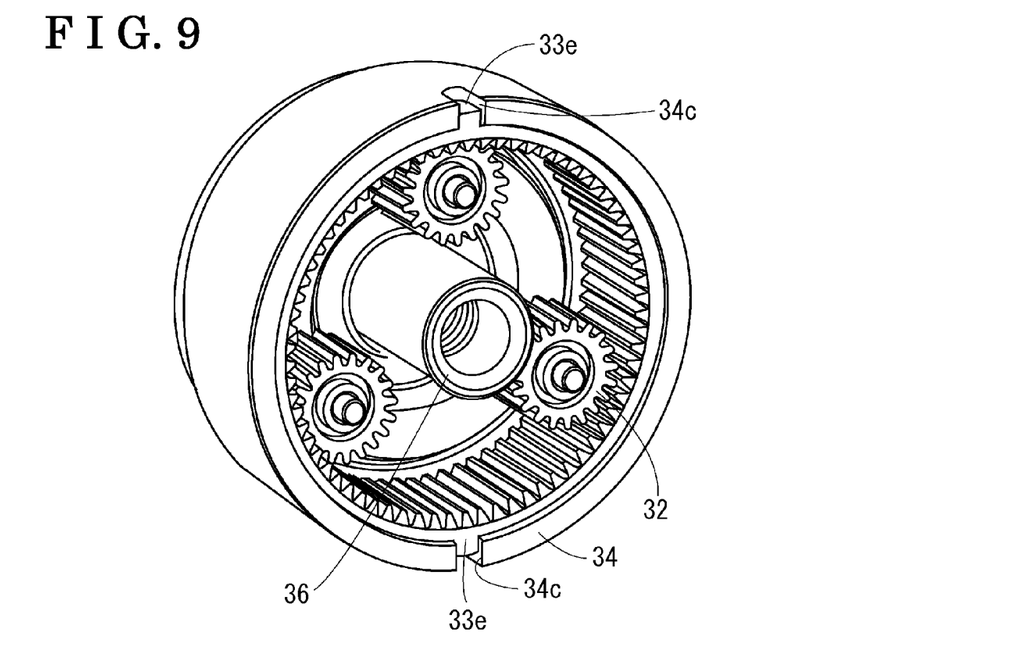
FIG. 9 is a perspective view showing a portion of the speed reduction mechanism according to the embodiment disclosed here.
Figure 10:
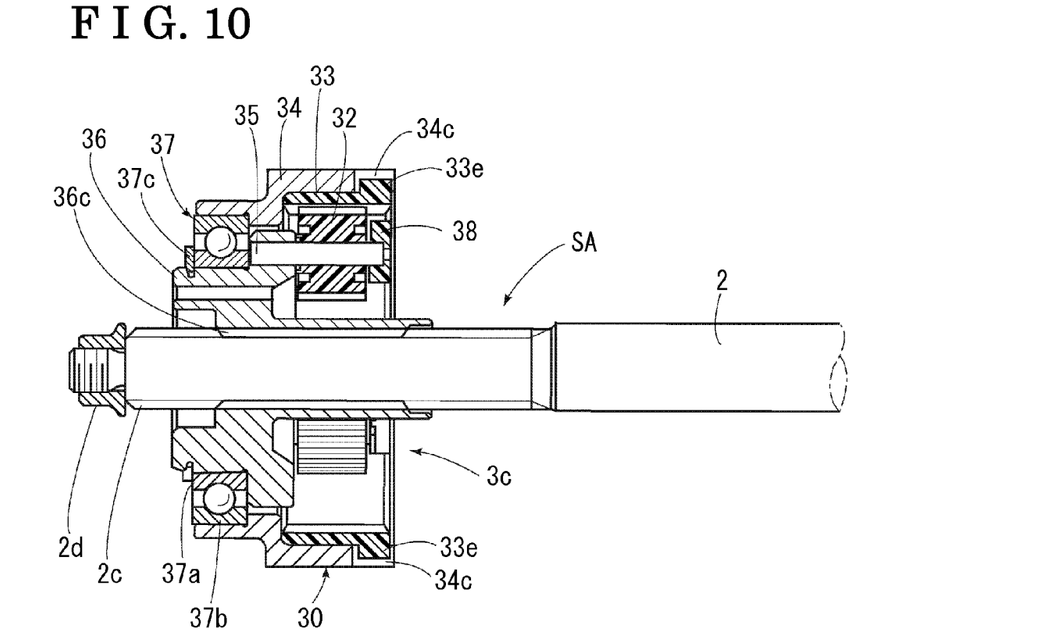
FIG. 10 is a longitudinal cross-sectional view of a sub-assembly that serves as a portion of an actuator according to the embodiment disclosed here.
Figure 11:
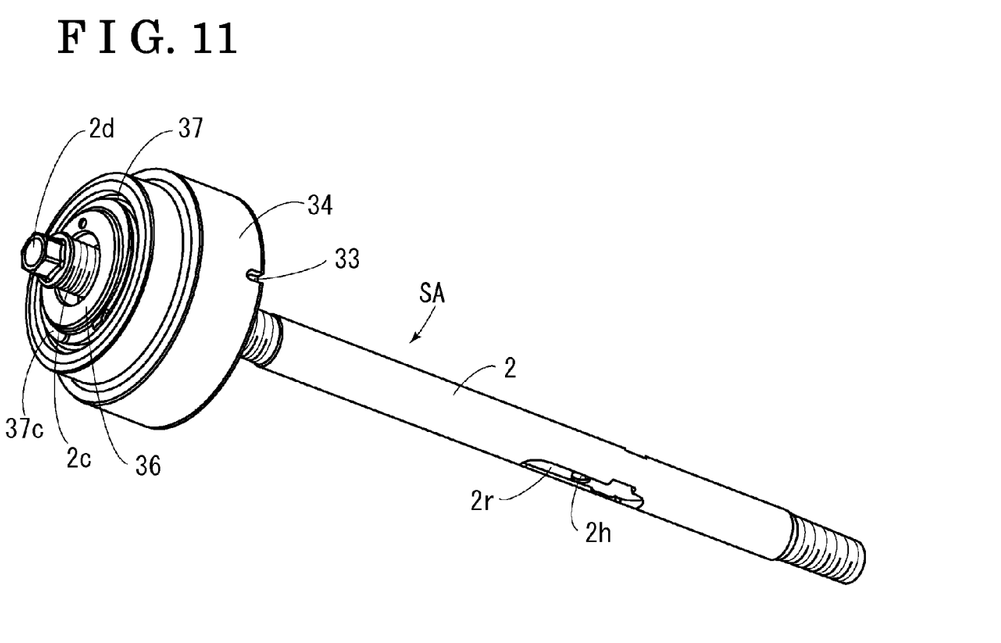
FIG. 11 is a perspective view of the sub-assembly that serves as the portion of the actuator according to the embodiment disclosed here.

As illustrated in FIG. 7, a protrusion 33f is formed at each of side surfaces of the engaging portions 33e, 33e. Thus, when inserting the ring gear 33 in the holder 34, as illustrated in FIGS. 8 and 9, the ring gear 33 is fitted to the holder 34 while the protrusions 33f, 33f of the engaging portions 33e, 33e, respectively, are pressed onto inner side surfaces of the grooves 34c, 34c. In consequence, as illustrated in FIGS. 9 and 10, the ring gear 33 is retained at the holder 34 in a state where a radial end surface and an axial end surface of the ring gear 33 is positioned inside a radial end surface and an axial end surface of the holder 34. FIG. 9 shows a state where the planetary gear 32 and the nut member 36 are assembled to the ring gear 33 and the holder 34. By attaching further components, for example, the bearing 37 and the rod 2, a sub-assembly SA shown in FIGS. 10 and 11 are structured.

A manufacturing method of the actuator unit AU will be explained hereinafter. First, the stator 24 on which the coils 23 is wound is press-fitted into the cylinder portion 10 by means of a press-fitting apparatus to be fixed at a predetermined position shown in FIG. 2. The motor cover 25 is inserted to be positioned in the cylinder portion 10, and the snap ring 14 is fixed to the annular groove 10a provided on an inner periphery of the cylinder portion 10. Separately from the foregoing steps, after the bearing 25b is press-fitted onto the hollow rotation shaft 20 to which the sun gear 31 is integrally formed, a presser member 22a made of resin and for retaining the permanent magnet 22 is press-fitted onto the hollow rotation shaft 20, and the core 21 is press-fitted onto the hollow rotation shaft 20. The permanent magnet 22 is magnetized in a sub-assembly state where the permanent magnet 22 is accommodated in the core 21 and a presser member 22b is press-fitted onto the hollow rotation shaft 20.

Next, the hollow rotation shaft 20 is inserted into the hollow portion of the stator 24 and the bearing 25b is retained in a state where the bearing 25b is fitted to the inner periphery of the motor cover 25 at the hollow portion of the motor cover 25. Further, a support member 26 to which a plastic magnet 6b for a magnetic pole sensor 6 is press-fitted onto an end portion of the hollow rotation shaft 20. After the plastic magnet 6b is magnetized, the casing 12 is joined to the cylinder portion 10 at the opening thereof closer to the electric motor 3a (i.e., right-hand side in FIG. 2) by means of bolts. An outer race of the bearing 12b is press-fitted into the annular groove 12a of the casing 12, and an inner race of the bearing 12b is fitted onto the hollow rotation shaft 20 when joining the casing 12 to the cylinder portion 10.

The inner race 37a of the bearing 37 is fitted onto the nut member 36 and is retained by the spacer 37c. The outer race 37b of the bearing 37 is fitted to the holder 34. Next, the ring gear 33 is attached to the holder 34, and the planetary gear 32 is supported by the nut member 36 by means of the pin 35, as illustrated in FIG. 10. Then, an engaging member 38 is engaged with the pin 35. The male screw portion 2c of the rod 2 is threadingly engaged with the female screw portion 36c of the nut member 36, and the nut 2d is threadingly engaged with an end of the male screw portion 2c to form the sub-assembly SA illustrated in FIGS. 10 and 11.

The rod 2 of the sub-assembly SA is inserted into the hollow rotation shaft 20 shown in FIGS. 1 to 3, the sun gear 31 is assembled to be engaged with the planetary gear 32 and the ring gear 33, and the holder 34 is inserted until an axial end surface of the holder 34 comes in contact with a side end surface of the snap ring 14. Thereafter, the connection cover 11 is attached to the cylinder portion 10 and the lock nut 13 is threadingly engaged with the cylinder portion 10. Accordingly, the outer race 37b of the bearing 37 and the holder 34 are firmly sandwiched and supported between the snap ring 14 and the connection cover 11. In those circumstances, the rod 2 extends penetrating through the bushes 2a, 2b provided at the casing 12 to reach the outside of the casing 12.

The magnetic block 50 is positioned at the first long groove 2r of the rod 2 within the casing 12 so that the retaining portion 52 is retained between the wall portions 12w, 12w.

Thus, when the bolt 51 is inserted into the through hole 2h of the rod 2 and threadingly engaged with the nut 54, the rod 2 is supported so as not to be rotatable relative to the housing 1.

Further, the electronic circuit board 40 to which the displacement sensor 5a is mounted is housed in the casing 12 and the displacement sensor 5a is fixed to the electronic circuit board 40 at a position that faces, or oppose to the permanent magnet 5b. Then, after a wire harness is connected, the cover members 15, 16 are fastened to the casing 12 via O-rings OR each serving as a sealing member by means of bolts, the casing 12 is sealed liquid-tightly. After being assembled in the foregoing manner, the ball joint JL is connected to the end of the rod 2 and a rubber boot BT is attached to the casing 12.

According to the embodiment, the rear wheel steering apparatus for a vehicle includes the housing (1) configured to be connected to the suspension mechanism supporting vehicle rear wheels via the first connection member (ball joint JA) and the second connection member (ball joint JL), the housing (1) including a cylinder portion (10) and a connection cover (11), the electric motor (3a) housed in the housing (1), the speed reduction mechanism (3b) housed in the housing (1) and reducing speed of an output of the electric motor (3a), the linear motion mechanism (3c) including the nut member (36) rotatably connected to the speed reduction mechanism (3b), the linear motion mechanism (3c) including the rod (2) threadingly engaged with the nut member (36) and connected to the second connection member (JL), the linear motion mechanism (3c) converting a rotation of the nut member (36) to a linear motion of the rod (2), the cylinder portion (10) housing the electric motor (3a) and the speed reduction mechanism (3b) which are arranged in series, the cylinder portion (10) including a stopper portion (10a, 14) provided at an inner surface of the cylinder portion (10) between the electric motor (3a) and the speed reduction mechanism (3b), the connection cover (11) including the first connection member (JA) and closing an opening of the cylinder portion (10) provided closer to the speed reduction mechanism (3b), the cylindrical holding member (holder 34) holding the speed reduction mechanism (3b) in the cylinder portion (10), and the bearing (37) supporting the nut member (36) for allowing the nut member (36) to rotate relative to the cylindrical holding member (holder 34). The bearing (37) and the cylindrical holding member (holder 34) are sandwiched between the stopper portion (10a, 14) of the cylinder portion (10) and the connection cover (11) and the cylindrical holding member (34) is retained so as not to rotate relative to the cylinder portion (10).

According to the construction of the embodiment, the axial load between the first connection member (ball joint JA) and the second connection member (ball joint JL) can be appropriately absorbed by the rod (2), the nut member (36), the bearing (37), the cylindrical holding member (holder 34), the cylinder portion (10), and the connection cover (11). In consequence, the rear wheel steering apparatus is reduced in size and weight without requiring a large-sized housing.

According to the embodiment, the stopper portion (10a, 14) corresponds to the stepwise portion formed on the inner periphery surface of the cylinder portion (10).

According to the construction of the embodiment, by forming the stopper portion with the stepwise portion, the rear wheel steering apparatus is manufactured and assembled readily, and thus manufacturing costs of the rear wheel steering apparatus is assumed to be relatively low.

According to the embodiment, the stopper portion corresponds to the snap ring (14) fixed to the annular groove (10a) provided at an inner periphery surface of the cylinder portion (10).

According to the construction of the embodiment, by forming the stopper portion with the snap ring (14), the rear wheel steering apparatus is manufactured and assembled readily, and thus manufacturing costs of the rear wheel steering apparatus is assumed to be relatively low.

According to the embodiment, the cylinder portion (10) and the connection cover (11) are fastened by the annular lock nut (13).

According to the construction of the embodiment, because the cylinder portion (10) and the connection cover (11) are fastened by the annular lock nut (13), the rear wheel steering apparatus is assembled readily and the axial load can be securely absorbed. Further, according to the construction of the embodiment, because the electric motor (3a) and the speed reduction mechanism (3b) are housed in the single cylinder portion (10) and the cylinder portion (10) is fastened to the connection cover (11) by the lock nut (13), the rear wheel steering apparatus can be assembled readily with the small number of components. Accordingly, the rear wheel steering apparatus is reduced in size and weight, and further a press-fitting process and a threadingly engaging process are assumed to be not required, thus, the manufacturing costs can be reduced.

According to the embodiment, the sub-assembly (SA) including the speed reduction mechanism (3b) and the linear motion mechanism (3c) is formed, the electric motor (3a) is assembled in the housing (1) of the sub-assembly, and the rod (2) is connected to the second connection member (JL) outside the cylinder portion (10).

According to the construction of the embodiment, the assembling process is further simplified and thus the manufacturing cost can be reduced.

According to the embodiment, the rear wheel steering apparatus for the vehicle includes the casing (12) positioned surrounding the rod (2) extending from the cylinder portion (10), the casing (12) being fixed to the cylinder portion (10) at an opening provided closer to the electric motor (3a), and the controller (4) for controlling an actuation of the electric motor (3a), the controller housed in the casing (12).

According to the construction of the embodiment, because the axial load can be appropriately absorbed, the casing (12) does not require high intensity and thus the rear wheel steering apparatus can be reduced in size and weight.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rear wheel steering apparatus for a vehicle, comprising:
   a housing configured to be connected to a suspension mechanism supporting vehicle rear wheels via a first connection member and a second connection member, the housing including a cylinder portion and a connection cover, the cylinder portion possessing an open end;
   an electric motor housed in the housing;
   a speed reduction mechanism housed in the housing to reduce an output speed of the electric motor, the open end of the cylinder portion being located closer to the speed reduction mechanism than the electric motor;

a linear motion mechanism including a nut member rotatably connected to the speed reduction mechanism and a rod threadingly engaged with the nut member and connected to the second connection member so that rotation of the nut member results in linear motion of the rod;

the cylinder portion housing the electric motor and the speed reduction mechanism which are arranged in series, the cylinder portion possessing an inner surface and a stopper portion projecting inwardly from the inner surface of the cylinder portion, the stopper portion being positioned axially between the electric motor and the speed reduction mechanism;

the connection cover including the first connection member and closing the open end of the cylinder portion;

a cylindrical holding member holding the speed reduction mechanism in the cylinder portion;

a bearing supporting the nut member and allowing the nut member to rotate relative to the cylindrical holding member;

the bearing and the cylindrical holding member being axially supported between the stopper portion and the connection cover by an axial pressure force so that the cylindrical holding member is retained so as not to rotate relative to the cylinder portion, a lock nut engaging both the cylinder portion and the connection cover to fasten the cylinder portion and the connection cover together, the lock nut being in threading engagement with a screw portion of the cylinder portion, and the axial pressure force being generated by the engagement of the lock nut with both the cylinder portion and the connection cover.

2. The rear wheel steering apparatus for the vehicle according to claim 1, wherein the bearing possesses one axial end surface in direct contact with the connection cover.

3. The rear wheel steering apparatus for the vehicle according to claim 1, wherein the stopper portion is a snap-ring positioned in a groove formed in the cylinder portion.

4. The rear wheel steering apparatus for the vehicle according to claim 1, wherein the stopper portion is a stepwise portion of the cylinder portion.

* * * * *